United States Patent
Kim et al.

(10) Patent No.: US 9,495,958 B2
(45) Date of Patent: *Nov. 15, 2016

(54) DIALOGUE SYSTEM USING EXTENDED DOMAIN AND NATURAL LANGUAGE RECOGNITION METHOD AND COMPUTER-READABLE MEDIUM THEREOF

(71) Applicant: SAMSUNG ELECTRONICS CO., LTD., Suwon-si, Gyeonggi-do (KR)

(72) Inventors: Hong Won Kim, Seoul (KR); Woo Sup Han, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 222 days.

This patent is subject to a terminal disclaimer.

(21) Appl. No.: 14/096,628

(22) Filed: Dec. 4, 2013

(65) Prior Publication Data

US 2014/0095152 A1  Apr. 3, 2014

Related U.S. Application Data

(63) Continuation of application No. 12/984,120, filed on Jan. 4, 2011, now Pat. No. 8,626,490.

(30) Foreign Application Priority Data

Jan. 4, 2010  (KR) .................. 10-2010-0000271

(51) Int. Cl.
*G10L 15/18* (2013.01)
*G06F 17/28* (2006.01)

(52) U.S. Cl.
CPC .......... *G10L 15/1822* (2013.01); *G06F 17/28* (2013.01); *G10L 15/1815* (2013.01)

(58) Field of Classification Search
CPC .................................................. G10L 15/1815
USPC .............................................................. 704/9
See application file for complete search history.

(56) References Cited

U.S. PATENT DOCUMENTS

| | | | |
|---|---|---|---|
| 7,249,018 B2 * | 7/2007 | Ross | G10L 15/1822 704/236 |
| 7,904,297 B2 | 3/2011 | Mirkovic et al. | |
| 7,930,302 B2 * | 4/2011 | Bandaru | G06F 17/30864 707/737 |
| 8,041,570 B2 | 10/2011 | Mirkovic et al. | |
| 8,073,681 B2 | 12/2011 | Baldwin et al. | |
| 8,311,827 B2 | 11/2012 | Hernandez et al. | |

(Continued)

FOREIGN PATENT DOCUMENTS

KR  10-2006-0091469  8/2006
KR  10-2007-0090642  9/2007

OTHER PUBLICATIONS

Office Action mailed Mar. 13, 2013 in U.S. Appl. No. 12/984,120.
(Continued)

*Primary Examiner* — Susan McFadden
(74) *Attorney, Agent, or Firm* — Staas & Halsey LLP

(57) ABSTRACT

A dialog system uses an extended domain in order to have a dialog with a user using natural language. If a dialog pattern actually input by the user is different from a dialog pattern predicted by an expert, an extended domain generated in real time based on user input is used and an extended domain generated in advance is used to have a dialog with the user.

19 Claims, 13 Drawing Sheets

(56) References Cited

U.S. PATENT DOCUMENTS 8,438,031 B2 * 5/2013 Ross ................... G10L 15/1822
 704/251
8,626,490 B2 * 1/2014 Kim ................... G10L 15/1815
 704/9

OTHER PUBLICATIONS

Notice of Allowance mailed Sep. 4, 2013 in U.S. Appl. No. 12/984,120.
Korean Office Action dated Jan. 21, 2016 in corresponding Korean Patent Application No. 10-2010-0000271, 4 pages.

* cited by examiner

FIG. 2

Where is a cup for mother? ~20

FIG. 3A

| Cup | | | |
|---|---|---|---|
| SYNONYM | HYPONYM | HYPERNYM | |
| NONE | coffee cup<br>teacup | dishware<br>tableware<br>container | ~30 |

FIG. 3B

| Mother | | | ~31 |
|---|---|---|---|
| SYNONYM | HYPONYM | HYPERNYM | |
| female parent | mama<br>mom | NONE | |

FIG. 5

|  |  | EXTENSION TYPE | WEIGHT SUM |
|---|---|---|---|
| 20 | Where is a cup for mother? | NONE | 0 |
| 23 | Where is a coffee cup for mother? | HYPONYM | 2 |
| 24 | Where is a teacup for mother? | HYPONYM | 2 |
| 25 | Where is dishware for mother? | HYPERNYM | 3 |
| 26 | Where is a container for mother? | HYPERNYM | 3 |
| 21 | Where is a cup for the female parent? | SYNONYM | 1 |
| 22 | Where is a cup for mama? | SYNONYM | 1 |
| 27 | Where is a coffee cup for the female parent? | HYPONYM, SYNONYM | 3 |
| 28 | Where is a coffee cup for mama? | HYPONYM | 4 |

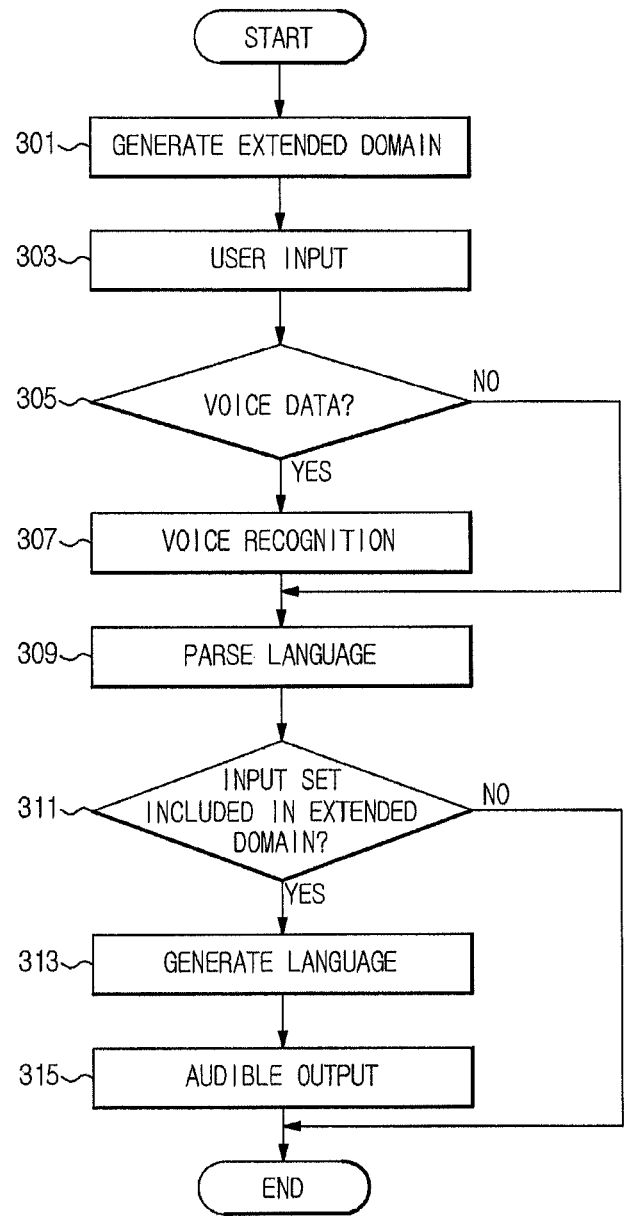

DIALOGUE SYSTEM USING EXTENDED DOMAIN AND NATURAL LANGUAGE RECOGNITION METHOD AND COMPUTER-READABLE MEDIUM THEREOF

CROSS-REFERENCE TO RELATED APPLICATIONS

This application is a continuation of U.S. patent application Ser. No. 12/984,120, filed on Jan. 4, 2011, which is currently pending, and claims the benefit of Korean Patent Application No. 10-2010-0000271, filed on Jan. 4, 2010 in the Korean Intellectual Property Office, the disclosure of which is incorporated herein by reference.

BACKGROUND

1. Field

Example embodiments relate to a dialogue system using an extended domain, which has a dialogue using a natural language used by a human, and a natural language recognition method and computer-readable medium thereof.

2. Description of the Related Art

Language is the basic means of human communication. Natural language recognition in a robot or an Automatic Response System (ARS) service providing apparatus communicating with a human is a recent major topic.

It is very difficult for a robot to completely understand all natural language used by a human and to respond thereto. Since it is difficult to translate all natural language into meaningful language and to use the meaningful language, the natural language is translated into meaningful language only within a group (hereinafter, referred to as a domain) obtained by organizing meanings necessary for a use environment and expressions corresponding thereto by an expert. For example, in the case where an expert configures a domain including an input set "Where is my cup?," when a user actually inputs an input set "Where is my mug?," because this input set is not present in the domain, the meaning thereof may not be understood. Since a dialogue pattern actually input by a user may be different from a dialogue pattern predicted by an expert, a natural language recognition rate of a dialogue system deteriorates.

SUMMARY

Therefore, it is an aspect of the example embodiments to provide a dialogue system which has a dialogue with a user using an extended domain to increase a natural language recognition rate, and a recognition method and computer-readable medium thereof.

The foregoing and/or other aspects are achieved by providing a method of recognizing natural language in a dialogue system, the method including parsing, by a processor, voice data of a user into syllables to generate an input set, understanding, by the processor, a user language using an input set of an initial domain generated before dialogue with the user and an extended input set of an extended domain generated upon dialogue with the user, generating, by the processor, a response sentence based on a result of understanding the user language and generating, by the processor, user language based on the response sentence.

When the parsed input set is not included in the initial domain, the extended domain may be used.

The extended domain may be generated by generating the extended input set using associated language data of a certain word configuring the parsed input set.

The associated language data may include at least one of a synonym, a hyponym and a hypernym associated with the certain word, and the extended input set may be generated by changing at least one word of the parsed input set to the associated language data.

The method may further include applying a weight to the extended input set in order to restrict a size of the generated extended domain, and stopping the generation of the extended domain if the weight applied to the extended input set is greater than a predefined value.

The weight may be differently applied depending on one of which words and how many words of the parsed input set are changed.

A weight applied to the extended input set generated by changing a certain word of the parsed input set to a hyponym may be greater than a weight applied to the extended input set generated by changing the certain word to a synonym, and a weight applied to the extended input set generated by changing the certain word to a hypernym may be greater than the weight applied to the extended input set generated by changing the certain word to the hyponym.

The foregoing and/or other aspects are achieved by providing a method of recognizing natural language in a dialogue system, the method including parsing, by a processor, voice data of a user into syllables to generate an input set, generating, by the processor, an extended domain including an extended input set generated using an initial input set generated by predicting meanings necessary for a use environment and expressions corresponding thereto and associated language data of the initial input set before dialogue with a user, and understanding user language using the extended input set of the extended domain, generating, by the processor, a response sentence based on a result of understanding the user language and generating, by the processor, user language based on the response sentence.

The foregoing and/or other aspects are achieved by providing a dialogue system using an extended domain, the dialogue system including a language parser to parse voice data of a user into syllables to generate an input set, a language understanding unit to understand user language using an input set of an initial domain generated before dialogue with the user and an extended input set of an extended domain generated upon dialogue with the user, a dialogue manager to generate a response sentence based on a result of understanding the user language, and a language generator to generate user language based on the response sentence.

The language understanding unit may further include an initial domain comparator to determine whether the parsed input set is included in the initial domain, and an extended domain comparator to determine whether the parsed input set is included in the extended domain, and, if the parsed input set is not included in the initial domain, the extended domain comparator may make a request for generation of the extended domain.

The language understanding unit may further include an associated word bank having associated language data of a certain word configuring the parsed input set, an input set generator to generate the extended input set using the associated language data, and an extended domain generator to make a request for generation of the extended input set to the input set generator according to the request for the generation of the extended domain.

The associated language data may include at least one of a synonym, a hyponym and a hypernym associated with the certain word, and the input set generator may change at least one word of the parsed input set to the associated language data.

The language understanding unit may further include a domain restrictor to restrict a size of the extended domain, and the domain restrictor may apply a weight to the extended input set and make a request for stoppage of the generation of the extended input set to the input set generator if the weight applied to the extended input set is greater than a predefined value.

The weight may be differently applied depending on one of which words and how many words of the parsed input set are changed.

The domain restrictor may apply, to the extended input set generated by changing a certain word of the parsed input set to a hyponym, a weight greater than a weight applied to the extended input set generated by changing the certain word to a synonym, and apply to the extended input set generated by changing the certain word to a hypernym a weight greater than the weight applied to the extended input set generated by changing the certain word to the hyponym.

The foregoing and/or other aspects are achieved by providing a dialogue system using an extended domain, the dialogue system including a language parser to parse voice data of a user into syllables to generate an input set, a language understanding unit to generate an extended domain including an extended input set generated using an initial input set generated by predicting meanings necessary for a use environment and expressions corresponding thereto and associated language data of the initial input set before dialogue with a user, and to understand user language using the extended input set of the extended domain, a dialogue manager to generate a response sentence based on a result of understanding the user language and a language generator to generate user language based on the response sentence.

According to example embodiments, if a dialogue pattern actually input by a user is different from a dialogue pattern predicted by an expert, an extended domain generated in real time based on a user input is used and an extended domain generated in advance is used so as to have a dialogue with the user. Accordingly, a natural language recognition rate of a dialogue system is improved.

BRIEF DESCRIPTION OF THE DRAWINGS

These and/or other aspects and advantages will become apparent and more readily appreciated from the following description of the embodiments, taken in conjunction with the accompanying drawings of which:

FIG. 2 is a diagram illustrating an input set present in an initial domain according to example embodiments;

FIGS. 3A and 3B are tables illustrating associated language data associated with a certain word of an input set according to example embodiments;

FIG. 5 is a table illustrating an extension type and a weight of an extended input set according to example embodiments;

FIG. 9 is a flowchart illustrating a natural language recognition method of a dialogue system using an extended domain according to example embodiments.

DETAILED DESCRIPTION

Figure 1:
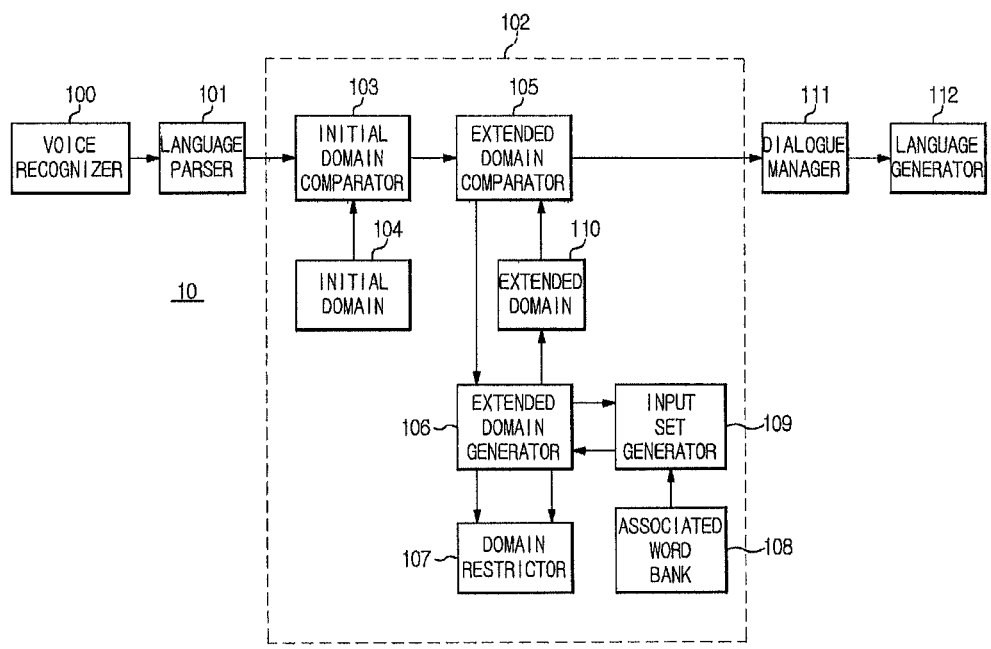
FIG. 1 is a diagram showing the configuration of a dialogue system using an extended domain according to example embodiment.

Reference will now be made in detail to the embodiments, examples of which are illustrated in the accompanying drawings, wherein like reference numerals refer to like elements throughout.

In a dialogue system using natural language, a dialogue with a user may progress by understanding text input using a keyboard or language recognized by voice recognition.

As shown in FIG. 1, a dialogue system 10 using an extended domain according to example embodiments may include a voice recognizer 100, a language parser 101, a language understanding unit 102, a dialogue manager 111 and a language generator 112.

The voice recognizer 100 may convert user voice input through a microphone into voice data and provide the voice data to the language parser 101.

The language parser 101 may receive the voice data, parse the voice data into syllables to generate an input set, and provide the parsed input set to the language understanding unit 102.

User input is not limited to voice. A user may input text using a keyboard instead of the voice recognizer 100 and the language parser 101 may generate and provide an input set.

The language understanding unit 102 may understand language input by the user based on the parsed input set and provide the understood result to the language manager 111. The language manager 111 may generate a response sentence to define a dialogue based on the understood result of the language, and provide the response sentence to the language generator 112. The language generator 112 may generate language corresponding to the response sentence. Thereafter, the language generated by the language generator 112 may be audibly output through a speaker to have a dialogue with a person. Text may be displayed simultaneously with or separately from a voice output, to have a dialogue with the user.

Figure 2:
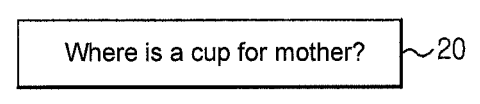

When the language understanding unit 102 understands the language based on the parsed input set, the input set may or may not be present in an initial domain 104. The initial domain 104 has input sets generated by organizing meanings necessary for a use environment and expressions corresponding thereto. For example, an input set 20 shown in FIG. 2 may be generated by an expert in advance.

A user dialogue pattern may be different from a dialogue pattern predicted by an expert. Accordingly, the parsed input set may not be included in the initial domain 104. In this case, an extended domain 110 may be generated by input sets generated using an associated word bank 108 of the language understanding unit 102, and the language input by the user may be understood by an input set present in the extended domain 110.

The associated word bank 108 may include a database established according to associated language data (a synonym, a hyponym and a hypernym) of a certain word. The synonym may have the same meaning as a certain word and may replace the certain word. The hyponym may not replace a certain word but may include subordinate-concept words of the certain word, and may be used to directly infer the certain word. The hypernym may include superordinate-concept words of a certain word, and may be used to indirectly infer the certain word.

For example, in associated language data 30 of a word "Cup", as shown in FIG. 3A, a word registered as a synonym of the word "cup" is not present, words "coffee cup" and "teacup" are registered as a hyponym of "cup", and words "dishware", "tableware" and "container" are registered as a hypernym of "cup." As another example, in associated language data of a word "mother", as shown in FIG. 3B, the words "female parent" are registered as a synonym of the word "Mother," words "mama" and "mom" are registered as a hyponym of the word "Mother," and a word registered as a hypernym of the word "Mother" is not present.

The input set generator 109 may receive the associated language data from the associated word bank 108 according to a request of an extended domain generator 106 and generate input sets necessary for domain extension. The extended domain 110 may be generated by the generated input sets.

A method of generating input sets by the input set generator 109 will now be described.

Figure 4A:
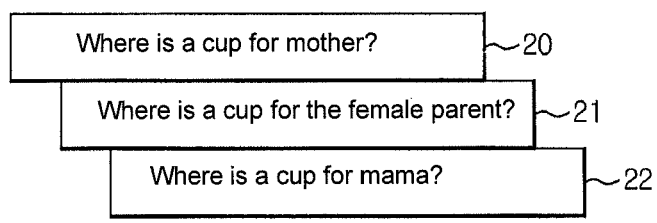
FIGS. 4A to 4D are diagrams illustrating generation of an extended input set to generate an extended domain according to example embodiments.
Figure 4B:
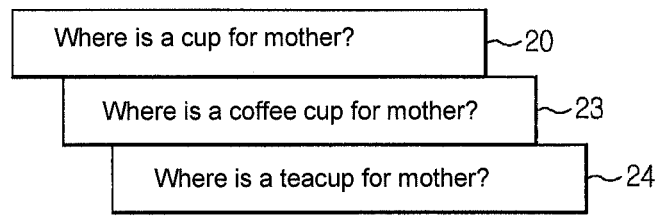
Figure 4C:
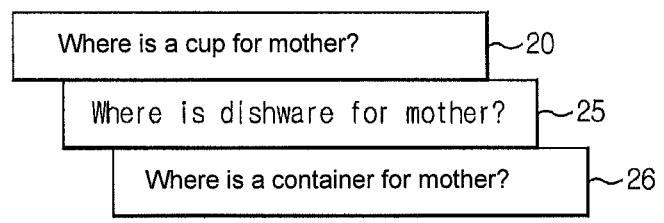

As shown in FIG. 4A, two extended input sets 21 and 22 may be generated by changing a word "mother" of an input set 20 to the synonym "female parent" and the hyponym "mama." In addition, as shown in FIG. 4B, two extended input sets 23 and 24 may be generated by changing a word "cup" of the input set 20 to the hyponyms "coffee cup" and "teacup." As shown in FIG. 4C, two extended input sets 25 and 26 may be generated by changing a word "cup" of the input set 20 to the hypernyms "dishware" and "container."

Figure 4D:
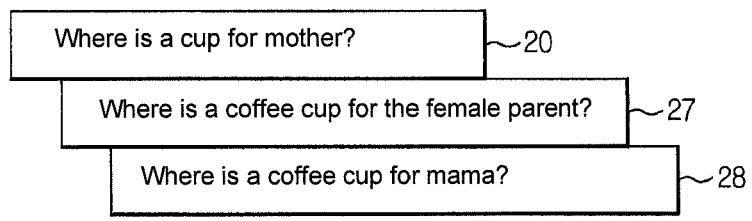

In addition, at least two words included in the input set 20 may be changed. As shown in FIG. 4D, two extended input sets 27 and 28 may be generated by changing the word "cup" of the input set 20 to the hyponym "coffee cup" and changing the word "mother" to the synonym "female parent" and the hyponym "mama."

Since an excessive number of input sets may be generated by the input set generator 109 generating input sets using the associated language data provided by the associated word bank 108, adequate restriction is necessary. A domain restrictor 107 may restrict the size of the extended domain 110 so that the number of input sets present in the extended domain 110 is not excessively increased.

The domain restrictor 107 may define extension types depending on which words or how many words of the input set generated by the user input are changed and apply weights according to the extension types, as shown in FIG. 5. At this time, the degree of change of the extended input set generated from the input set may be checked by the applied weight.

If a changed portion of the extended input set has a meaning similar to a meaning thereof before change, a small weight may be applied and if a changed portion of the extended input set has a different meaning, a large weight may be applied. For example, a weight "1" may be applied to an extended input set obtained by changing a word to a synonym, a weight "2" may be applied to an extended input set obtained by changing a word to a hyponym, and a weight "3" may be applied to an extended input set obtained by changing a word to a hypernym.

As shown in FIG. 5, respective weights may be applied to the extended input sets 21, 22, 23, 24, 25, 26, 27 and 28 generated from the input set 20 of the initial domain 104 according to the extension types. If a weight sum is large, the number of changed portions may be relatively large and, if the weight sum is small, the number of changed portions may be relatively small.

Since the weights are applied to the extended input sets, the applied weights and a predefined value to restrict the domain may be compared to restrict the size of the extended domain 110. An input set having a weight sum less than the predefined value may be included in the extended domain 110 and an input set having a weight sum greater than the predefined value may not be included in the extended domain 110, thereby restricting the size of the extended domain 110. Thus, the extended domain 110 may include only input sets each having a weight sum less than the predefined value. For example, if the predefined value is set to 3 in order to restrict the size of the extended domain 110, only seven input sets 21, 22, 23, 24, 25, 26 and 27 may be included in the extended domain 110, excluding one input set 28 having a weight sum of 4. As another example, if the predefined value is set to 6 in order to restrict the size of the extended domain 110, all eight input sets 21, 22, 23, 24, 25, 26, 27 and 28 each having a weight sum less than the predefined value may be included in the extended domain 110.

Figure 6:
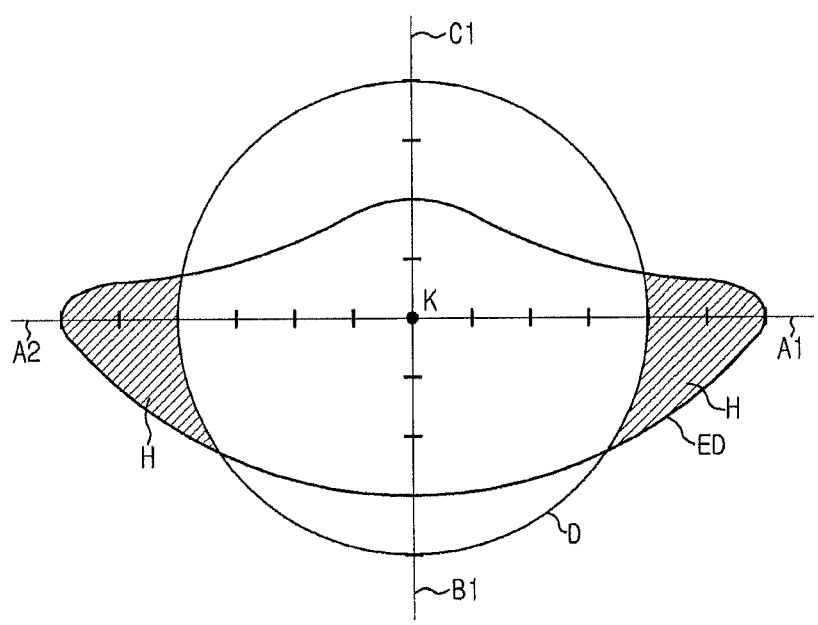
FIG. 6 is a schematic diagram showing the range of an extended domain according to example embodiments.

The range ED of the extended domain 110 restricted by the weights may be shown schematically in FIG. 6. The range ED of the extended domain 110 may be obtained in the case where the predefined value is set to 6. A certain word K may be consecutively changed to synonyms having a weight of 1 to perform 6-step extension. The consecutive change may indicate that the changed synonym is changed to another synonym again. In addition, a certain word may be consecutively changed to hyponyms to perform 3-step extension or may be consecutively changed to hypernyms to perform 2-step extension. If the weight sum does not exceed 6, the synonym, the hyponym and the hypernym may be mixed to perform extension.

The range ED of the extended domain 110 may be wider in a first synonym direction A1 and a second synonym direction A2 to which a relatively small weight is applied than in a first hyponym direction B1 and a first hypernym direction C1. The range ED of the extended domain 110 generated in consideration of weights may be wider in the synonym direction than a domain D extending to a constant distance from a certain word K in all associated word (synonym, hyponym and hypernym) directions. Input sets which are not included in the domain D may be included in a hatched portion H.

Since the range ED of the extended domain 110 extends widely in the synonym direction, an input set more similar to an input pattern of the user in terms of meaning may be included although an input dialogue pattern of the user deviates from a predicted dialogue pattern. In addition, the size of the domain may decrease.

Hereinafter, the operation of a dialogue system using an extended domain according to the example embodiments will be described.

Figure 7:
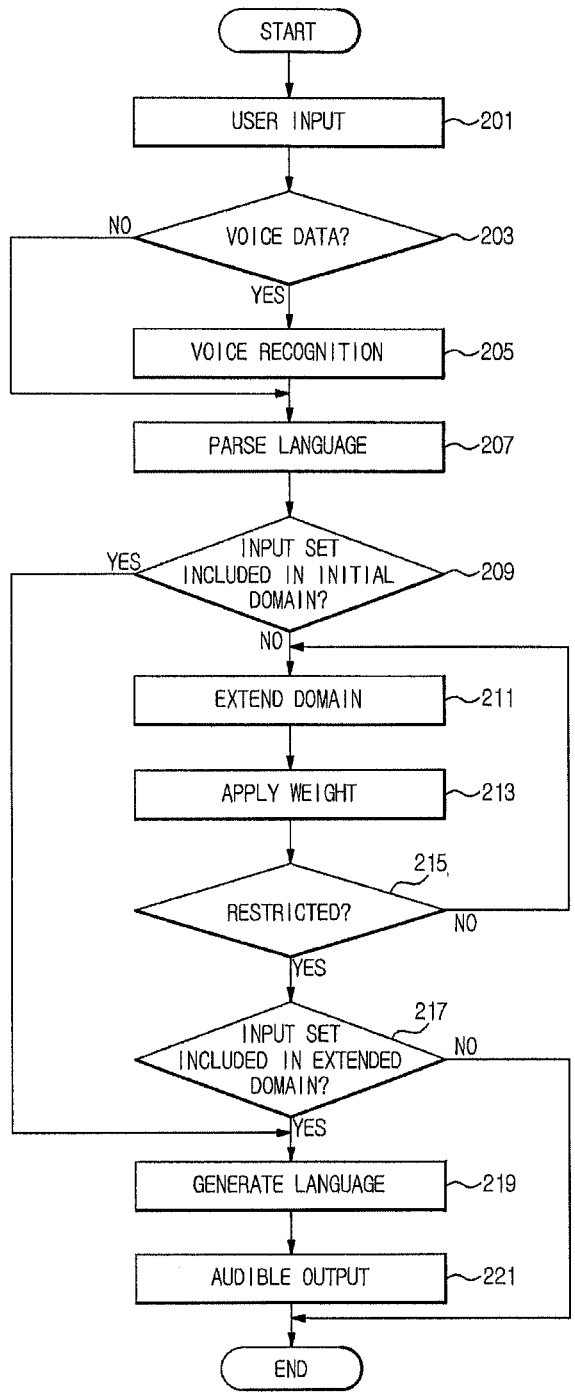
FIG. 7 is a flowchart illustrating a natural language recognition method of a dialogue system using an extended domain according to example embodiments.

Referring to FIG. 7, a user who wants to have a dialogue may input a voice signal (201). Then, the voice recognizer 100 may convert the input voice signal into voice data and provide the voice data to the language parser 101. The signal input by the user may not be limited to the voice signal. Although not specially described in the example embodiments, the user who wants to have a dialogue may input text using a keyboard to provide the text to the language parser 101.

If the voice data is received (Yes in 203), voice recognition may be performed using the voice data provided by the language parser 101, the voice data may be parsed into syllables to generate an input set, and provide the input set to an initial domain comparator 103 (205 and 207).

The initial domain comparator 103 may determine whether the parsed input set is included in the initial domain 104 (209). If the parsed input set is included in the initial domain 104 (Yes in 209), then the language may be understood based on the input set and the understood result may be provided to the dialogue manager 111. Then, the dialogue manager 111 may generate and provide the response sentence to define the dialogue to the language generator 112, and the language generator 112 may generate language used to have a dialogue with the user according to the response sentence (219). Thereafter, the language generated by the language generator 112 may be audibly output through a speaker, thereby providing a dialogue with the user (221). The language generated by the language generator 112 may be displayed as text simultaneously with or separately from a voice output, thereby providing a dialogue with the user.

If the parsed input set is not included in the initial domain 104 (No in 209), an extended domain comparator 105 may provide the parsed input set to an extended domain generator 106 to make a request for domain extension. Then, the extended domain generator 106 may make a request for generation of an input set to generate an extended domain to the input set generator 109. The input set generator 109 may generate extended input sets based on the synonym, the hyponym and the hypernym received from the associated word bank 108 with respect to words configuring the parsed input set. As shown in FIGS. 4A to 4D, the extended input sets may be generated using the synonym, the hyponym and the hypernym and the extended domain 110 may be generated using the generated extended input sets (211).

The domain restrictor 107 may apply weights to the generated extended input sets and provide information about the weights to the extended domain generator 106. The information about the weights may include weights applied according to extension types defined depending on which words or how many words of the input set are changed. The degree of change of the input set may be checked by the weights applied to the extended input sets. If a changed portion of the extended input set has a meaning similar to a meaning thereof before change, a small weight may be applied and if a changed portion of the extended input set has a different meaning from a previous meaning, a large weight may be applied (213).

The extended domain generator 106 may determine whether the size of the extended domain 110 needs to be restricted according to the information about the weights received from the domain restrictor 107. If the sum of weights applied to the input set generated by the input set generator 109 is less than the predefined value (No in 215), the domain may continue to be extended. If the sum of weight applied to the input set generated by the input set generator 109 is greater than the predefined value, it is recognized that the size of the extended domain 110 may need to be restricted (Yes in 215) to make a request for stoppage of the generation of the input set to the input set generator 109. Then, the input set generator 109 may stop the generation of the input set.

After generating the extended domain 110, the extended domain comparator 105 may determine whether the parsed input set is included in the extended domain 110 (217). If the parsed input set is included in the extended domain 110 (Yes in 217), the extended domain comparator 105 may understand the language based on the input set and provide the understood result of the language to the dialogue manager 111. Then, the dialogue manager 111 may generate a response sentence to define a dialogue and provide the response sentence to the language generator 112, and the language generator 112 may generate language to have a dialogue with the user according to the response sentence (219). The language generated by the language generator 112 may be audibly output through the speaker (221). The language generated by the language generator 112 may be displayed as text simultaneously with or separately from voice output, thereby providing a dialogue with the user.

If the parsed input set is not included in the extended domain 110 (No in 217), the dialogue system 10 may ignore the user input, finish the process, and wait for user voice input.

Although an extended domain may be generated with respect to user voice input in real time to have a dialogue with a user in the example embodiments, an extended domain may be generated in advance to have a dialogue with a user based on the extended domain as in the following example embodiments.

Figure 8:
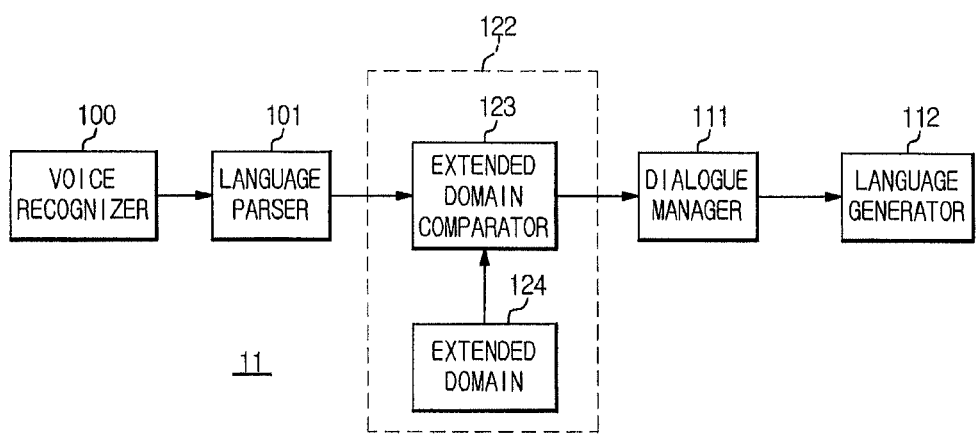
FIG. 8 is a diagram showing the configuration of a dialogue system using an extended domain according to example embodiments.

As shown in FIG. 8, a dialogue system 11 using an extended domain according to example embodiments may include a voice recognizer 100, language parser 101, language understanding unit 122, dialogue manager 111, and language generator 112. The components other than the language understanding unit 122 are substantially equal to those of the above-described example embodiments and are denoted by the same reference numerals.

The language understanding unit 122 may include an extended domain comparator 123 and an extended domain 124.

The extended domain 124 may include an initial input set generated by predicting meanings necessary for a use environment and expressions corresponding thereto and an extended input set generated using associated language data (synonym, hyponym and hypernym) of the initial input set. The extended domain 124 may be generated in advance. Then, when having a dialogue with a user, the extended domain comparator 123 may understand language using input sets included in the extended domain 124. Thereafter, language to define a dialogue may be generated based on the understanding of the language and audibly output, thereby providing a dialogue with the user.

Referring to FIG. 9, the extended domain 124 may be generated in advance (301) and a user may input a voice signal (303). The voice recognizer 100 may convert the input voice signal into voice data and provide the voice data to the language parser 101. The user may input text through a keyboard to provide the text to the language parser 101.

If the voice data is received (Yes in 305), the language parser 101 may perform voice recognition based on the voice data, parse the voice data to generate an input set, and provide the input set to the extended domain comparator 123 (307 and 309).

The extended domain comparator 123 may determine whether the parsed input set is included in the extended domain 124 (311).

If the parsed input set is included in the extended domain 124 (Yes in 311), language may be understood based on the input set and the understood result of the language may be provided to the dialogue manager 111. Then, the dialogue manager 111 may generate a response sentence to define a dialogue and provide the response sentence to the language generator 112, and the language generator 112 may generate user language according to the response sentence (313). The user language generated by the language generator 112 may be audibly output through a speaker (315). The language generated by the language generator 112 may be displayed as text simultaneously with or separately from voice output, thereby providing a dialogue with the user.

The above-described embodiments may be recorded in non-transitory computer-readable media including program instructions to implement various operations embodied by a computer. The media may also include, alone or in combination with the program instructions, data files, data structures, and the like. Examples of computer-readable media (computer-readable storage devices) include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although embodiments have been shown and described, it should be appreciated by those skilled in the art that changes may be made in these embodiments without departing from the principles and spirit of the disclosure, the scope of which is defined in the claims and their equivalents.

What is claimed is:

1. A method of recognizing natural language in a dialogue system, the method comprising:
    by at least one hardware processor interfaced with a memory including instructions which control the at least one hardware processor to:
        input voice data of a user;
        parse the voice data of the user to generate a parsed input set;
        determine whether the parsed input set is included in an initial domain including an initial input set generated before dialogue with the user and in an extended domain including an extended input set generated upon dialogue with the user;
        provide an understood result comprising content based on at least one of the initial input set and the extended input set according to a result of the determination; and
        output the understood result.

2. The method according to claim 1, wherein when the parsed input set is not included in the initial domain, the extended domain is used.

3. The method according to claim 1, wherein the extended domain is generated by generating the extended input set using associated language data of a certain word of the parsed input set.

4. The method according to claim 3, wherein:
    the associated language data includes at least one of a synonym, a hyponym and a hypernym associated with the certain word, and the extended input set is generated by changing at least one word of the parsed input set to the associated language data.

5. The method according to claim 4, wherein the instructions further control the at least one hardware processor to apply a weight to the extended input set in order to restrict a size of the generated extended domain, and to stop the generation of the extended domain if the weight applied to the extended input set is greater than a predefined value.

6. The method according to claim 5, wherein the weight is differently applied depending on which word of the parsed input set is changed, or depending on a number of words of the parsed input set are changed.

7. The method according to claim 6, wherein a weight applied to the extended input set generated by changing a certain word of the parsed input set to a hyponym is greater than a weight applied to the extended input set generated by changing the certain word to a synonym, and a weight applied to the extended input set generated by changing the certain word to a hypernym is greater than the weight applied to the extended input set generated by changing the certain word to the hyponym.

8. A method of recognizing natural language in a dialogue system, the method comprising:
    by at least one hardware processor interfaced with a memory including instructions which control the at least one hardware processor to:
        input voice data of a user;
        parse the voice data of the user to generate a parsed input set;
        generate an extended domain including an extended input set generated using an initial input set generated by predicting meanings necessary for a use environment and expressions corresponding thereto and associated language data of the initial input set before dialogue with a user;
        determine whether the parsed input set is included in an initial domain including the initial input set and in the extended domain;
        provide an understood result comprising content based on at least one of the initial input set and the extended input set according to a result of the determination; and
        output the understood result.

9. A dialogue system using an extended domain, the dialogue system comprising:
    at least one hardware processor interfaced with a memory including instructions which control the at least one hardware processor to:
        parse voice data of a user to generate a parsed input set;
        determine whether the parsed input set is included in an initial domain including an initial input set generated before dialogue with the user and in an extended domain including an extended input set generated upon dialogue with the user;
        provide an understood result comprising content based on at least one of the initial input set and the extended input set according to a result of the determination; and
        output the understood result.

10. The dialogue system according to claim 9,
    wherein, if the parsed input set is not included in the initial domain, the at least one processor makes a request for generation of the extended domain.

11. The dialogue system according to claim 10, wherein the instructions further control the at least one hardware processor to:

maintain an associated word bank having associated language data of a certain word configuring the parsed input set;
generate the extended input set using the associated language data; and
make a request for generation of the extended input set to the input set generator according to the request for the generation of the extended domain.

12. The dialogue system according to claim 11, wherein the associated language data includes at least one of a synonym, a hyponym and a hypernym associated with the certain word, and
at least one word of the parsed input set is changed to the associated language data.

13. The dialogue system according to claim 11, wherein the instructions further control the at least one hardware processor to:
restrict a size of the extended domain, and
apply a weight to the extended input set and makes a request for stoppage of the generation of the extended input set if the weight applied to the extended input set is greater than a predefined value.

14. The dialogue system according to claim 13, wherein the weight is differently applied depending on which word of the parsed input set is changed, or depending on a number of words of the parsed input set are changed.

15. The dialogue system according to claim 13, wherein the instructions further control the at least one hardware processor to apply to the extended input set generated by changing a certain word of the parsed input set to a hyponym a weight greater than a weight applied to the extended input set generated by changing the certain word to a synonym, and applies to an extended input set generated by changing the certain word to a hypernym a weight greater than the weight applied to the extended input set generated by changing the certain word to the hyponym.

16. A dialogue system using an extended domain, the dialogue system comprising:
at least one hardware processor interfaced with a memory including instructions which control the at least one hardware processor to:
parse voice data of a user to generate a parsed input set;
generate an extended domain including an extended input set generated using an initial input set generated by predicting meanings necessary for a use environment and expressions corresponding thereto and associated language data of the initial input set before dialogue with a user;
determine whether the parsed input set is included in an initial domain including the initial input set and in the extended domain;
provide an understood result comprising content based on at least one of the initial input set and the extended input set according to a result of the determination;
and
output the understood result.

17. At least one non-transitory computer readable medium comprising computer readable instructions that control at least one processor to implement the method of claim 1.

18. At least one non-transitory computer readable medium comprising computer readable instructions that control at least one processor to implement the method of claim 8.

19. A dialogue system using an extended domain, the dialogue system comprising:
at least one hardware processor interfaced with a memory including instructions which control the at least one hardware processor to:
parse voice data of a user to generate a parsed input set;
determine whether the parsed input set is included in an initial domain including an initial input set generated before dialogue with the user and in an extended domain including an extended input set generated upon dialogue with the user;
provide an understood result comprising content based on at least one of the initial input set and the extended input set according to a result of the determination;
generate a response sentence based on the understood result; and
generate user language according to the response sentence by using the initial domain and the extended domain.

* * * * *